United States Patent
Leibl

(10) Patent No.: US 11,735,990 B2
(45) Date of Patent: Aug. 22, 2023

(54) LINEAR MOTOR SYSTEM AND METHOD FOR OPERATING

(71) Applicant: Schneider Electric Industries SAS, Rueil-Malmaison (FR)

(72) Inventor: Thomas Leibl, Seelbach (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/456,599

(22) Filed: Nov. 26, 2021

(65) Prior Publication Data

US 2022/0173646 A1   Jun. 2, 2022

(30) Foreign Application Priority Data

Nov. 27, 2020 (EP) ..................................... 20306457

(51) Int. Cl.
*H02K 41/02* (2006.01)
*H02P 29/00* (2016.01)
(Continued)

(52) U.S. Cl.
CPC .............. *H02K 41/02* (2013.01); *H02P 29/00* (2013.01)

(58) Field of Classification Search
CPC ........ H02K 41/02; H02K 41/03; H02K 21/02; H02P 25/06
(Continued)

(56) References Cited

U.S. PATENT DOCUMENTS

2018/0062535 A1* 3/2018 Kaulmann ........... G01R 31/343

FOREIGN PATENT DOCUMENTS

DE   20 2016 104 643 U1   8/2017
EP   2 654 199 A1   10/2013
(Continued)

OTHER PUBLICATIONS

Extended European Search Report dated May 19, 2021 in European Patent Application No. 20306457.1 (with English translation of Category of Cited Documents), citing documents AO-AR therein, 9 pages.

*Primary Examiner* — Jose A Gonzalez Quinones
(74) *Attorney, Agent, or Firm* — Oblon, McClelland, Maier & Neustadt, L.L.P.

(57) ABSTRACT

The invention relates to a linear motor system, in particular a transport system, e.g. a multicarrier, comprising: a guide track having a plurality of electromagnets that are arranged distributed along the guide track and that are supplied with electrical energy from a power supply network; at least one carrier that is guided at and movable along the guide track and that comprises a drive magnet for cooperating with the electromagnets of the guide track to move the carrier; and a control device for controlling the movement of the carrier relative to the guide track by energizing some of the electromagnets by means of a drive current, characterized in that the control device is configured to energize at least some of the electromagnets with a damping current such that the energizing with the damping current results, on the one hand, in no additional movement and/or no change in the movement of the carrier along the guide track generated by the drive current and/or, on the other hand, in no additional force on the carrier and/or no change in the force on the carrier generated by the drive current, in particular along the guide track, wherein the energizing with the damping current is performed to reduce oscillations and/or current and voltage fluctuations in the power supply network.

17 Claims, 8 Drawing Sheets

Figure 1:
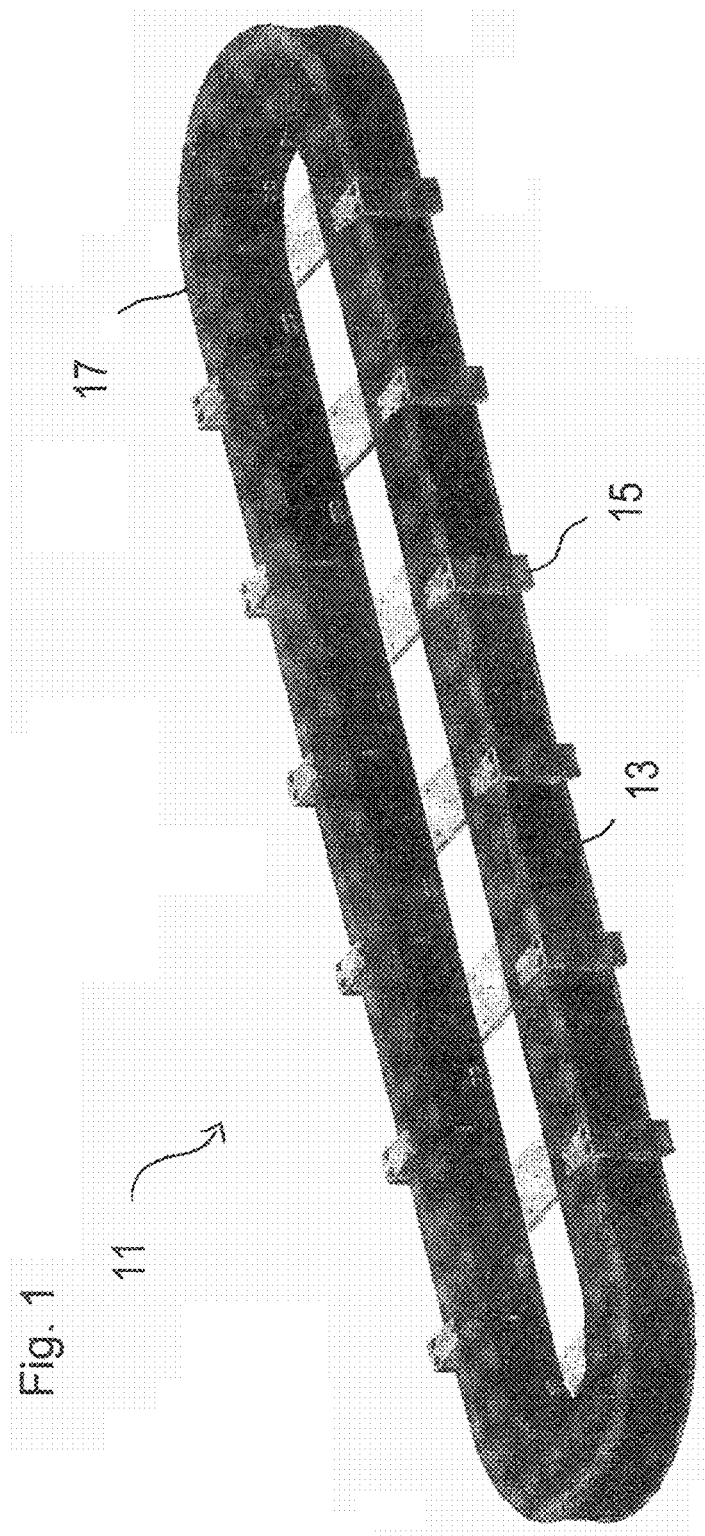

(51) Int. Cl.
*H02K 41/03* (2006.01)
*H02K 21/02* (2006.01)

(58) Field of Classification Search
USPC .......................................... 310/12.01, 12.08
See application file for complete search history.

(56) References Cited

FOREIGN PATENT DOCUMENTS

| EP | 3 487 049 A1 | | 5/2019 | |
|----|----|----|----|----|
| EP | 3487049 A1 | * | 5/2019 | |
| EP | 3 653 551 A1 | | 5/2020 | |
| EP | 3653551 A1 | * | 5/2020 | ............... G03F 3/10 |

* cited by examiner

LINEAR MOTOR SYSTEM AND METHOD FOR OPERATING

The present invention relates to a linear motor system, in particular a transport system, such as a multicarrier. The linear motor system comprises a guide track having a plurality of electromagnets that are arranged distributed along the guide track and that are supplied with electrical energy from a power supply network. At least one carrier of the linear motor system is guided at and movable along the guide track. The carrier comprises a drive magnet for cooperating with the electromagnets of the guide track to move the carrier. The linear motor system further comprises a control device for controlling the movement of the carrier relative to the guide track. The control of the movement is effected by energizing at least one of or only some of the electromagnets by means of a drive current.

Such linear motor systems and, for example, multicarriers serve in industrial processes to transport workpieces and, for example, to transfer them from one processing step to the next. For this purpose, the carriers of such a multicarrier can be moved separately from one another by controlling the electromagnets of the guide track differently in each case in order to effect the respective movement of the carrier.

Due to acceleration and deceleration movements of the carriers, the required electrical power of the linear motor system can change in each case, whereby current and voltage fluctuations in the power supply network can occur. The electromagnets are frequently also supplied with electrical energy from the power supply network via switching converters, wherein these switching converters together with the electromagnets can then act as a load having a constant power. Such a load having a constant power can act like a negative impedance and can trigger oscillations in the power supply network.

Such oscillations and/or current and voltage fluctuations are undesirable and are conventionally reduced, for example, by providing large buffer capacities in the linear motor system or by integrating active converters. In both cases, the integration of additional components into the linear motor system is disadvantageously necessary, whereby the required installation space can increase. In addition, the manufacturing costs for the linear motor system can increase.

It is the underlying object of the invention to provide a linear motor system that enables a simplified reduction of oscillations and/or current and voltage fluctuations in the power supply network.

This object is satisfied by a linear motor system in accordance with claim 1.

In accordance with the invention, the control device is configured to energize at least some of the electromagnets with a damping current such that the energizing with the damping current results, on the one hand, in no additional movement and/or no change in the movement of the carrier along the guide track generated by the drive current and/or, on the other hand, in no additional force on the carrier and/or no change in the force on the carrier generated by the drive current, in particular along the guide track. In this respect, the energizing with the damping current is in particular performed to reduce oscillations and/or current and voltage fluctuations in the power supply network.

The invention is therefore based on the recognition that (damping) current can be imparted into the electromagnets (more specifically, into the coils of the electromagnets) to temporarily store electrical power, whereby e.g. specific loads and/or oscillations in the power supply network can be reduced again. Accordingly, the electrical power can be stored as magnetic energy in the magnetic field of the respective electromagnet. The electromagnets are preferably coils having a soft magnetic core. The damping current can be controlled such that it effects a damping of oscillations and/or current and/or voltage fluctuations in the power supply network.

The damping current can, for example, be used to consume excess energy in the power supply network and/or to transfer missing energy from the storage in the electromagnets back into the power supply network. The damping current can therefore be used both for energy storage (transmitting energy to the electromagnets) and for energy recovery (feeding electrical energy from the electromagnets back into the power supply network).

Due to the damping current, no additional or changed movement of the carriers and/or no additional or changed application of force to the carriers along the guide track occurs/occur. In other words, the movement (or the rest) of the respective carrier along the guide track effected by the drive current is left unchanged by the damping current. Unchanged in this respect means that no change noticeable to a user takes place and/or that the change is below a predetermined threshold value. For example, a speed change can be below 3%, 1%, or preferably below 0.1% of the speed effected by the drive current. In the case of a carrier at rest, the position displacement due to the damping current cannot be greater than e.g. 3%, 1%, or 0.1% of the length of the carrier along the guide track.

However, the damping current can cause the carrier to be drawn more or less strongly towards the respective electromagnet transversely to the guide track.

In accordance with the invention, it is advantageous that the damping of oscillations and/or current and/or voltage fluctuations can take place by components already included in the linear motor system, in particular by the electrical control of the electromagnets that is anyway present. Additional components, such as large buffer capacities, can hereby be omitted.

Advantageous further developments of the invention can be seen from the description, from the drawings, and from the dependent claims.

In accordance with a first embodiment, the control device is configured to energize at least some of those electromagnets by means of the damping current that do not effect a movement of the carrier, in particular along the guide track, at a respective point in time. For example, electromagnets that are too far away from the carrier to initiate a movement of the carrier can be acted on by the damping current. In this respect, it naturally has to be taken into account that electromagnets arranged closer to the carrier can be acted on by less damping current and electromagnets located further away from the carrier can in turn be acted on by more damping current without effecting a movement of the carrier.

The basic idea here is to use currently "unused" electromagnets for the intermediate storage of electrical energy. Accordingly, an embodiment can also provide that the control device is configured to impart the damping current into electromagnets that are not flowed through by drive current at a respective point in time—on a conventional control of the electromagnets without damping current.

In accordance with a further embodiment, the control device is configured to impart the damping current into electromagnets that are also energized with drive current. As an alternative to the embodiment described above, the damping current can also be imparted into electromagnets that are currently already flowed through by drive current.

Due to the damping current of an electromagnet alone, a movement of the carrier and/or a force on the carrier would then usually be changed so that damping current can also be imparted into at least one further electromagnet in this case such that the damping current in all the electromagnets (in the vicinity of a respective carrier) as a result produces no change in the movement of the carrier or no additional movement of the carrier.

In accordance with an embodiment, the control device can therefore be configured to reduce the drive current in at least one of the electromagnets by means of the damping current and to impart damping current into an adjacent electromagnet for this purpose in order to compensate a changed force effect on the carrier through the reduced drive current. This can, for example, take place when the drive current in an electromagnet located very close to the carrier is reduced by the damping current. The smaller force on the carrier resulting therefrom can then in particular be compensated by a further remote electromagnet that is energized with damping current and thus compensates the smaller force on the carrier. Due to the larger distance of the electromagnet, which is just energized with damping current, a larger current is necessary there. Due to the larger current, electrical energy can then in turn be buffered to dampen oscillations in the power supply network.

Therefore, it can be seen that the drive current and the damping current can be superposed in one or more electromagnets in accordance with an embodiment. The resulting current from the drive current and the damping current then effects a magnetic field that in turn exerts a force on the drive magnet of the carrier and in this way results in a movement of the carrier. In this connection, movement, for example, means an acceleration, a deceleration, or a driving at a constant speed. A fixed holding of the carrier in a predefined position can also be effected by the drive current or by the resulting current. It is understood that the damping currents overall (i.e. the damping currents in all the coils) should cause (almost) no change in the movement and/or the force on the carrier, in particular only in the direction of movement.

In accordance with a further embodiment, the drive current and damping current imparted into the electromagnets taken together are at least temporarily greater than the drive current alone, with energy being stored in the electromagnets due to the larger total current. The drive current, as already indicated above, is the current that is usually (i.e. without damping current) imparted into the electromagnets for normal operation (i.e. to move the carriers). Since additional energy is at least temporarily buffered from the power supply network in the electromagnets, it follows that the total current for the electromagnets is at least temporarily (i.e. during the buffering of excess energy) greater than the drive current alone would be.

In accordance with a further embodiment, the electromagnets are connected to the power supply network by means of switching converters, with the switching converters preferably each acting as a load having a constant power. The switching converters, more precisely the switching converters together with the electromagnets connected to each of them, can thus act as a so-called "constant power load" (CPL) and thus as a negative impedance, whereby oscillations can be amplified. The oscillations can, for example, occur in cooperation with capacitances or inductances anyway present in the power supply network and/or in the linear motor system. The switching converters are preferably arranged between the power supply network and the electromagnets. The switching converters can in particular be DC-DC converters, but also AC-DC converters.

As stated in the following, the linear motor system can be divided into a plurality of segments. A separate switching converter can preferably be provided in each segment and/or per coil or electromagnet.

In accordance with a further embodiment, the power supply network is a DC voltage network having a voltage of preferably less than 80 V or less than 60 V. The power supply network can therefore be a so-called DC grid. A plurality of, and preferably all of, the switching converters of the linear motor system can be connected in a parallel connection to the power supply network. For this purpose, the power supply network can in particular comprise a power supply rail or the like to which the switching converters are electrically connected, in particular directly. The switching converters can preferably be connected in a parallel connection to the power supply network.

In accordance with a further embodiment, the control device is configured to take into account, for the selection of at least one electromagnet that is to be energized with damping current, an induction voltage (EMF—electromotive force) caused by the carrier in a plurality of the electromagnets on the movement of the carrier. The control device can measure and/or calculate or otherwise determine the induction voltage. The measurement takes place when the carrier is in motion. A measurement that has once been made can be stored and reused for similar carrier positions and/or carrier speeds. Based on the induction voltage, it can then be determined which electromagnets are subsequently energized with damping current.

The magnitude of the amount of the induction voltage is a measure of how efficiently a current flow in an electromagnet produces a force on the carrier. For example, those electromagnets can be provided for the energizing with damping current in which the magnitude of the induction voltage is below a predetermined threshold value. The provided electromagnet can then be energized with damping current.

It is understood that the induction voltages for different electromagnets can be detected at the same time.

Alternatively or additionally, a ratio of the induction voltages can be determined for at least two pairs of more electromagnets. In inverse proportion to the ratio, a damping current can then be imparted into the electromagnet.

The induction voltage for one electromagnet can in particular be determined first, whereupon the induction voltage of at least one further electromagnet is then put in relation with said induction voltage for one electromagnet. If the ratio (or the magnitude of the ratio) exceeds a predetermined threshold value, the electromagnet with the (magnitudewise) smaller induction voltage can be provided for the energizing with damping current and can subsequently be energized with damping current. For example, a voltage of 18 V can be induced in a first electromagnet on the movement of a carrier. The first electromagnet can e.g. be located very close to the drive magnet of the carrier. An induction voltage in a second electromagnet, which is e.g. further away from the drive magnet, can purely by way of example in contrast amount to only −1.56 V. The ratio of the magnitudes is consequently 11.5. If a ratio of at least 10 is now assumed as the predetermined threshold value, the second electromagnet is now provided for the energizing with damping current. It is likewise possible to determine the induction voltages for two second electromagnets that are in particular arranged symmetrically to the first electromagnet. If the resulting current in the first electromagnet is now reduced by e.g. 5% in the course of the energizing with damping current, the resulting current in the two second electromagnets can be increased more by the ratio of the magnitudes, that is e.g. by 5%*11.5=57.5%. This will also be described in the following with reference to FIG. 8.

In accordance with a further embodiment, the control device is configured to generate a negative damping current for at least one of the electromagnets at least temporarily in order to feed electrical energy into the power supply network. Alternatively or additionally, the control device can be configured to generate a positive damping current for at least one electromagnet at least temporarily in order to lead off electrical energy from the power supply network. As already briefly stated above, the energy stored in the electromagnets can therefore also be fed back into the power supply network again, whereby a reduction of oscillations and/or current and/or voltage fluctuations can likewise be achieved. Due to the feeding in or feeding back of the electrical energy, load peaks can also e.g. be covered on the starting up or during strong accelerations of the carriers.

In accordance with a further embodiment, the linear motor system has a plurality of segments that each comprise a plurality of the electromagnets, with the control device preferably being distributed over a plurality of the segments. The segments or the parts of the control device can each communicate with one another. This preferably takes place with a segment-to-segment communication (S2S), for example, by means of a field bus (e.g. Sercos). The damping current can either be calculated and generated per segment, wherein the control device of a segment can either only control the electromagnets of its respective segment or can alternatively also cause the imparting of damping current into electromagnets of other segments. It is likewise possible that the control device of the different segments jointly determines the damping current and assigns it to different electromagnets.

In accordance with a further embodiment, at least one sensor is provided, with the sensor detecting the current and/or the voltage in the power supply network and converting it into a sensor signal. The sensor signal can then be the basis for generating the damping current. It is likewise possible that a separate sensor is present in each segment or in a plurality of segments to detect oscillations and/or current and voltage fluctuations in the power supply network depending on the position. The respective sensor can then be coupled to the control device provided in the respective segment.

In accordance with a further embodiment, the control device comprises a control loop for generating the damping current, with the control loop comprising a reproduction of a negative impedance and a reproduction of a damping member, as also explained in more detail with reference to FIG. 4. The reproduction can in each case be a model, e.g. a simulation model or a mathematical model. The control loop preferably outputs a control signal that serves as the basis for the damping current. The aforementioned sensor signal can be an input signal for the control loop. An output value of the reproduction of the damping member and/or of the negative impedance can in each case be superposed on the input signal in the control loop. This means that the output values can be fed back to the input signal. Due to the provision of the reproduction of the negative impedance and the reproduction of the damping member, the effect of the loads having a constant power and a desired damping effect (which may correspond to a large buffer capacitor, for example) can be simultaneously reproduced in the control loop. The control signal output by the control loop then automatically has the effect that the desired damping effect (e.g. the reduction of oscillations) is achieved by the damping current. A more complex calculation of the damping current can be omitted by simply providing the reproduction of the damping member in the control loop.

The control loop is preferably arranged in the control device and is, for example, implemented by software. In accordance with a further embodiment, the control loop comprises a logic that determines the damping current for the electromagnets from a control signal, in particular based on further boundary conditions. It can in particular be seen from the control signal how large the damping current should be at a respective point in time.

A voltage induced by the drive magnet of the carrier into the electromagnets and/or an induced current (so-called "back EMF") can also be taken into account in the determination of the damping current, in particular by the control loop.

However, as explained above, the damping current can be implemented in different ways, for example, by an imparting into coils not currently in use or by a corresponding change of the drive current in a plurality of coils. The logic can now determine the exact magnitude and distribution of the damping current. For example, the instantaneous coil temperatures, the instantaneous power, the direction of movement of the carriers and the like can be used as boundary conditions for this purpose. For example, coils that are already strongly heated cannot be considered for the damping current in order not to heat them even further. The damping current can also e.g. be imparted into coils that do not have to be used soon (based on the direction of movement of the carriers) to move the carrier by means of drive current.

In accordance with a further embodiment, the linear motor system comprises a plurality of segments, with each segment comprising a plurality of the electromagnets, with the segments being arranged in a row and forming a peripheral guide track, with the guide track being arranged at an outer side of the respective segments. The segments can, for example, each have their own housing and can be in electrical contact with one another by means of plug connectors, for example. Two mechanical guide rails, on which rollers of the carriers move along to guide the carriers along the guide track, can be arranged at the outer side of the segments, for example. The electromagnets can be arranged between the two guide rails, wherein the carriers are pulled towards the guide track by the drive magnets. The carriers can each comprise an angled portion such that the carriers have a fastening surface that is guided along the upper side of the segments and that serves to receive and/or to transport workpieces.

The guide track is preferably peripheral such that the carriers could generally be infinitely moved in the same direction along the guide track. The linear motor system further preferably comprises straight segments and segments in which the guide track describes a curve. The electromagnets are accordingly arranged along the guide track in a straight or curved line.

It is a further object of the invention to provide a method of operating a linear motor system, in particular a transport system, for example a multicarrier, wherein the linear motor system comprises:
    a guide track having a plurality of electromagnets that are arranged distributed along the guide track and that are supplied with electrical energy from a power supply network;

at least one carrier that is guided at and movable along the guide track and that comprises a drive magnet for cooperating with the electromagnets of the guide track to move the carrier; and a control device for controlling the movement of the carrier relative to the guide track by energizing some of the electromagnets by means of a drive current.

The method in accordance with the invention is characterized in that at least some of the electromagnets are energized with a damping current such that the energizing with the damping current results, on the one hand, in no additional movement and/or no change in the movement of the carrier along the guide track generated by the drive current and/or, on the other hand, in no additional force on the carrier and/or no change in the force on the carrier generated by the drive current, in particular along the guide track, wherein the energizing with the damping current is performed to reduce oscillations and/or current and/or voltage fluctuations in the power supply network.

The statements made on the linear motor system in accordance with the invention apply accordingly to the method in accordance with the invention. This in particular applies with respect to advantages and embodiments.

Figure 2:
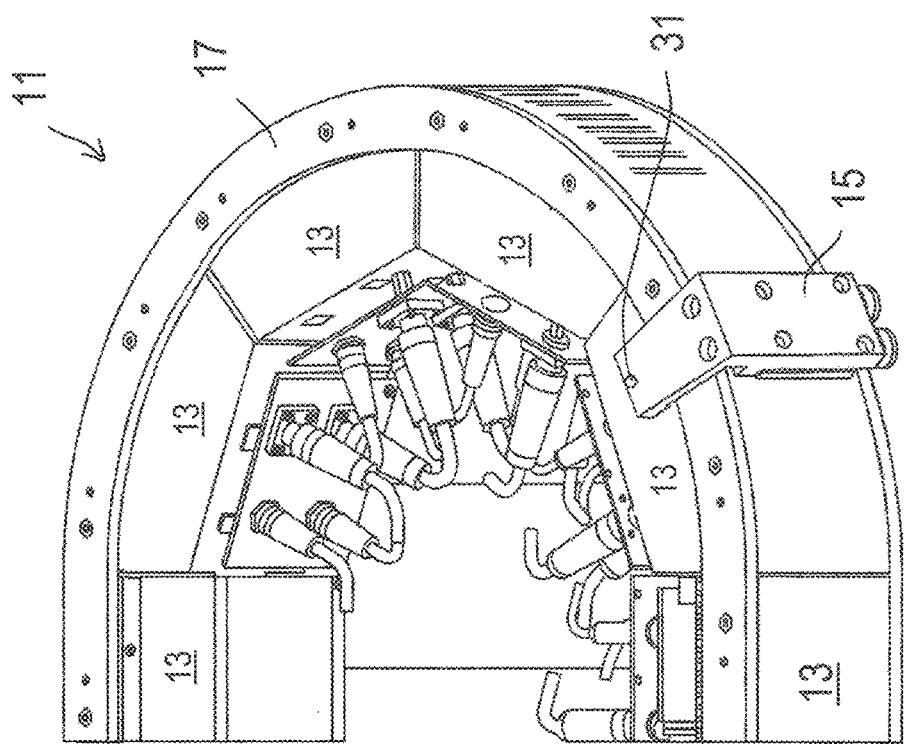
Figure 3:
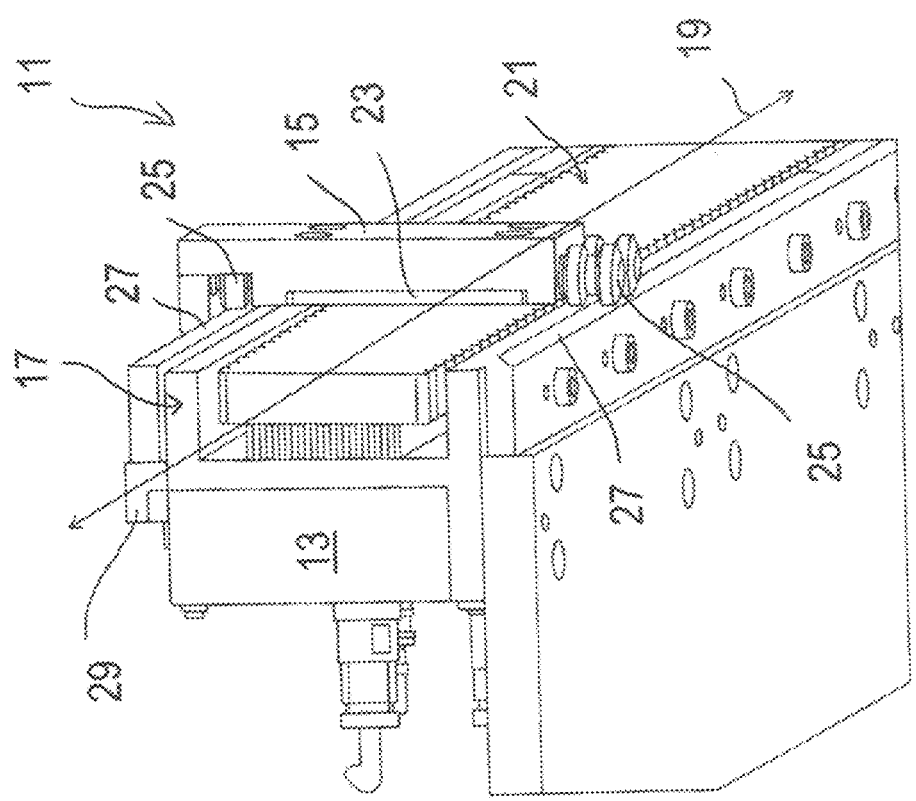
Figure 4:
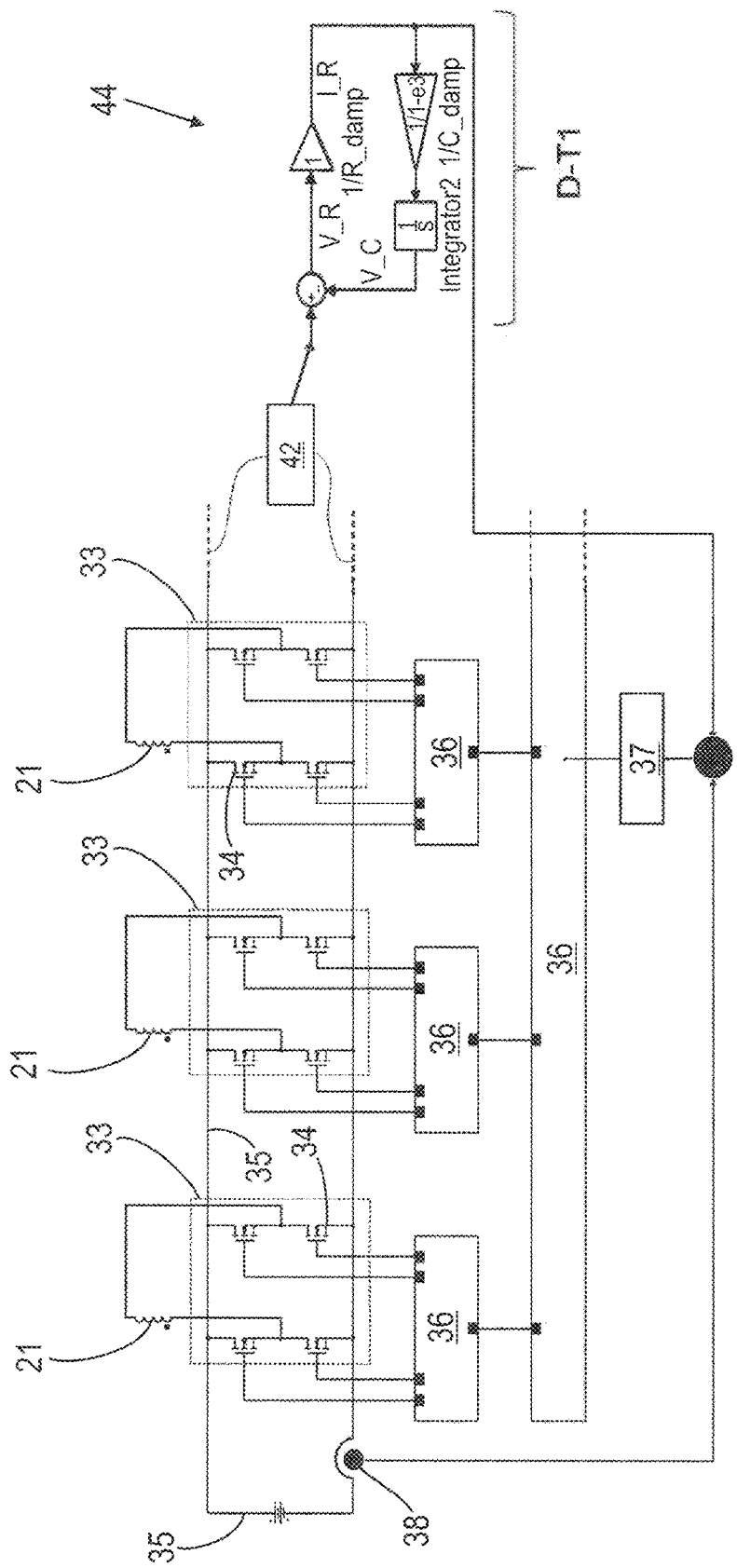
Figure 5:
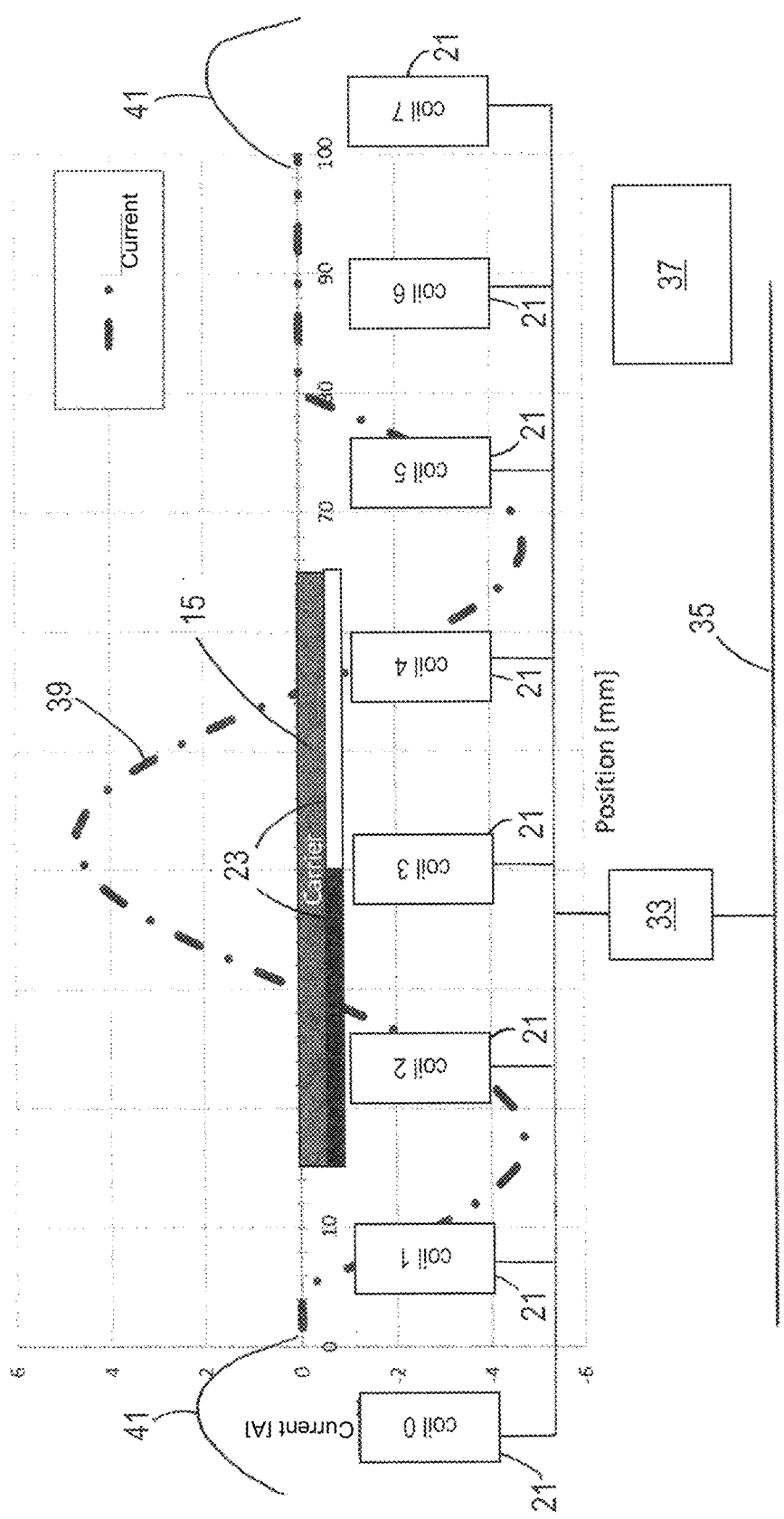
Figure 6:
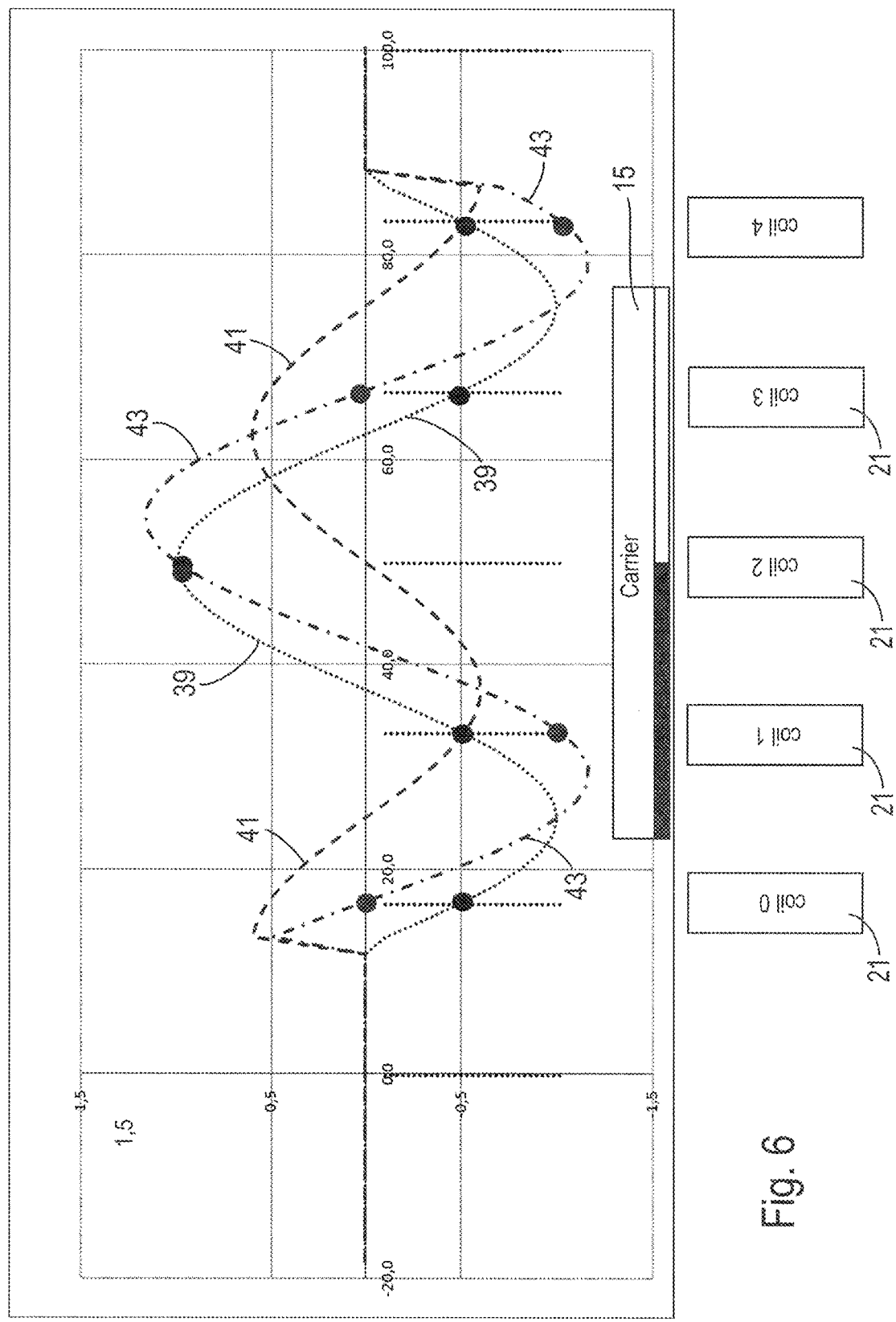
Figure 7:
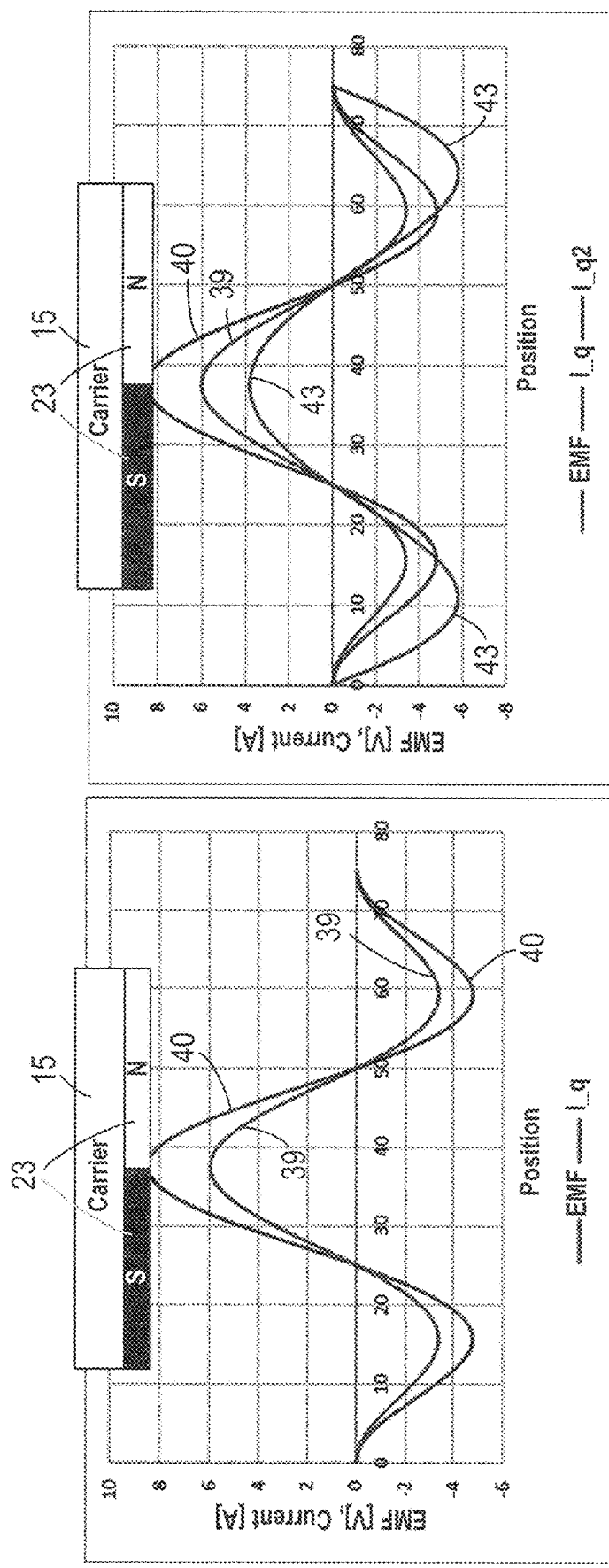
Figure 8:
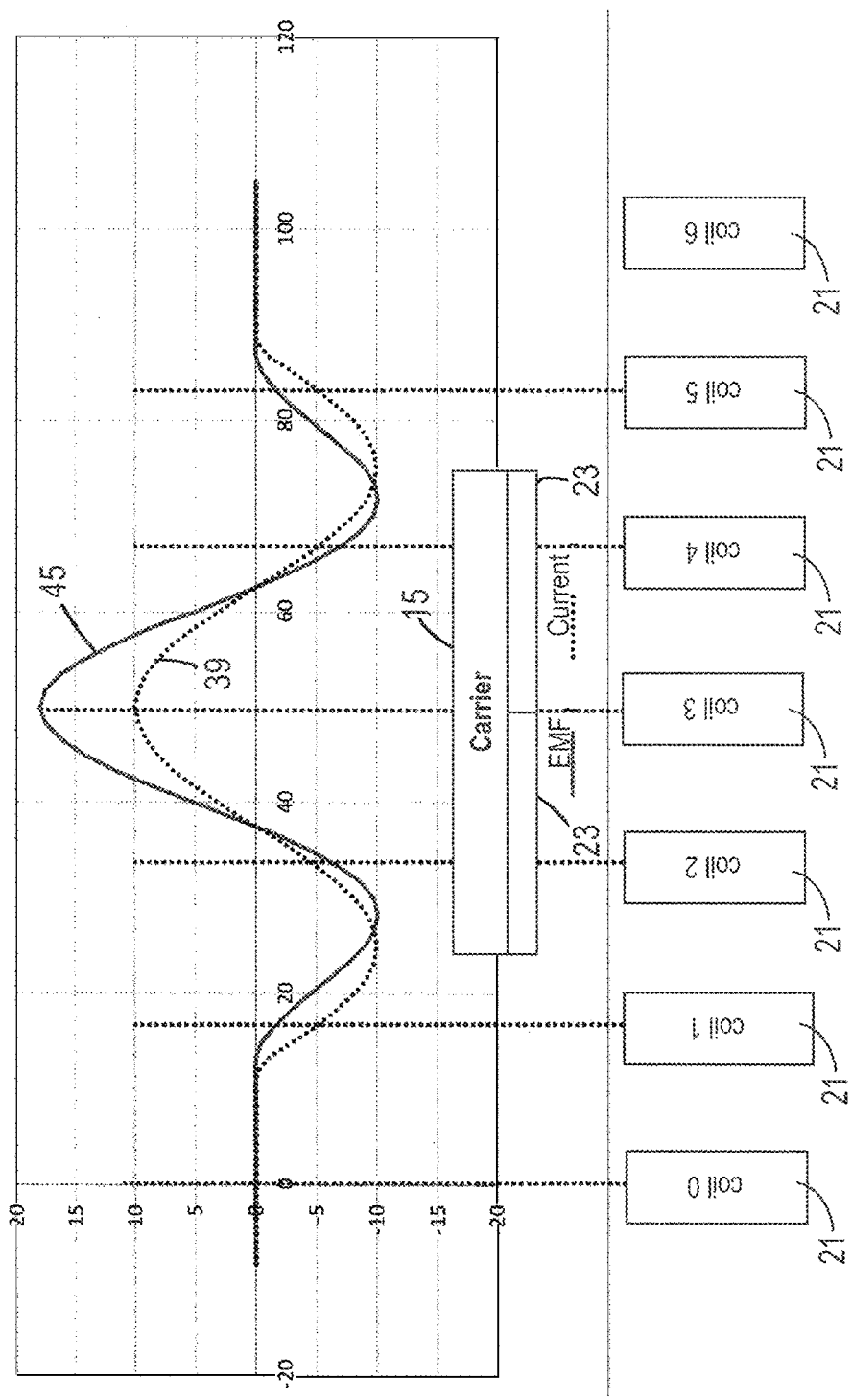

The invention will be described purely by way of example with reference to the drawings in the following. There are shown:

FIG. 1 a linear motor system configured as a transport system;

FIG. 2 a curve section of the linear motor system of FIG. 1;

FIG. 3 a perspective sectional view of the linear motor system of FIG. 1 with a sectional plane perpendicular to the guide track;

FIG. 4 a schematic representation of the circuit for regulating the current in the electromagnets;

FIG. 5 a schematic representation of the electromagnets of the transport system together with a diagram of a damping current that is imparted into electromagnets remote from the carrier;

FIG. 6 the imparting of a damping current into electromagnets without a force effect on the carrier;

FIG. 7 the change of the drive current by a damping current;

FIG. 8 the selection of an electromagnet for the damping current based on an induced current.

A linear motor system 11, which is configured as a multi-carrier system, is shown in FIG. 1. The linear motor system 11 comprises a plurality of segments 13 that are arranged in a row such that a continuous and in this case a revolving movement of the carriers 15 along a guide track 17 is made possible. The transport system 11 further comprises a plurality of carriers 15 that form individual transport elements of the transport system 11 and that can be moved independently of one another along the guide track 17 by means of the electromagnets in the segments 13 (e.g. shown in FIG. 3). The segments 13 form a linear motor together with the carriers 15.

FIG. 2 shows a curve section of the linear motor system 11 in an enlarged view. Only one carrier 15 is shown here that is movable along the guide track 17 by means of the segments 13. Different electronic devices for controlling the segments 13 are visible at the side of the guide track 17 remote from the carrier 15, i.e. within the curve section.

In FIG. 3, the linear motor system 11 is shown in a sectional view and enlarged. A carrier 15 is visible that is movably guided at the guide track 17. In this respect, the carrier 15 is movable along a guide axis 19 or a movement axis. For a movement along the guide axis 19, the carrier 15 is controlled by a plurality of electromagnets 21 that are arranged at the guide track 17 and that are uniformly distributed along it. In this respect, the electromagnets 21 cooperate with a permanent magnet 23, which is arranged at the carrier 15 and which can also be designated as a drive magnet, to drive the carrier.

The carrier 15 is mechanically guided at the guide track 17, and indeed by a roller guide. Said roller guide comprises guide rollers 25 at the carrier 15 and guide rails 27 at the guide track 17. The carrier 15 is in this respect held at the guide track 17, in particular via the permanent magnet 23.

The linear motor system 11 furthermore comprises a position detection device 29. Said position detection device can, for example, be configured as a series of a plurality of magnetic sensors that extends along the guide track 17. A permanent magnet 31, which can also be designated as a position magnet and is visible in FIG. 2, can be provided at the carrier 15, for example.

FIG. 4 shows a schematic representation of the circuit for regulating the current in coils of the electromagnets 21. The electromagnets 21 are each electrically connected to a DC power supply network 35 by means of a separate switching converter 33. A control device 37 controls the current flow through the electromagnets 21, in particular through the transistors 34 shown in the switching converters 33 and control electronics 36 that is in each case connected upstream of the transistors 34. The transistors 34 selectively establish an electrical connection between the power supply network 35 and the electromagnets 21.

A current sensor 38 and a voltage sensor 42 are also connected to the power supply network 35. A signal of the current sensor 38 is supplied to the control device 37.

A signal, in particular a digitized signal, of the voltage sensor 42 is fed to a model 44 comprising a negative impedance ("1/R_damp") and a damping capacitor ("1/C_damp"). The model of the damping capacitor is in a feedback loop and is subtracted from the signal of the voltage sensor 42. The model 44, together with a control loop of the control device 37, effects a damping of oscillations in the power supply network 35. It is understood that the model 44 is arranged in the control device and is only externally shown for a better understanding.

FIG. 5 shows the electromagnets 21 of a segment 13 relative to the carrier 15 or to its drive magnets 23. The north and south poles of the drive magnet 23 are shown separately in this respect.

A drive current 39 is furthermore shown over the different electromagnets 21 in FIG. 5. The drive current 37 shown is in this respect a superposition of the currents imparted in the different electromagnets 21, with positive and negative values indicating the direction of the current. The drive current 39 shown results in a movement of the carrier 15.

It can be seen that the coils of the electromagnets 21, which are shown at the right margin in FIG. 5, are not energized with drive current 39. These electromagnets 21 are too far away from the carrier 15 to have a force effect on the carrier 15. In accordance with FIG. 5, a damping current 41 is imparted into these electromagnets 21 that temporarily stores energy from the power supply network 35 in these electromagnets 21.

By means of the position detection device 29, those electromagnets 21 that currently have to be energized with drive current 38 to move the carrier 15 can be determined in each case. In addition, the control device 37 can also be configured to detect current in the electromagnets 21 that is induced by the drive magnet 23 of the carrier 15 and to determine or to verify the position of the carriers 15 based on said current.

Another embodiment for generating the damping current 41 is shown in the diagrams of FIG. 6. In this embodiment, the damping current 41 is imparted into electromagnets 21 that are also acted on by drive current 39. The dotted line shows a typical course of the drive current 39 when the carrier 15 is moved over the coil at a constant speed and force. The current course of the drive current 39 is typically selected such that the force effect of all the electromagnets 21 together on the carrier is as linear as possible, wherein a low total current is simultaneously sought after. It is understood that alternative current courses of the drive current 39 are possible.

In FIG. 6, a possibility for the damping current 41 is also shown as a dashed line. The damping current 41 applies in the case that the carrier 15 moves at a constant speed over the electromagnets 21, wherein, due to the damping current 41, in total no force acts on the carrier 15 in the direction of movement.

Finally, the resulting coil current 43, which results from the drive current 39 and the damping current 41 as the current actually flowing in the electromagnets 21, is also shown as a dash-dot line.

FIG. 7 shows a further embodiment for implementing the damping current 41. In the left diagram of FIG. 7, a "normal" current distribution of the drive current 39 is shown. The induced coil current 40 is likewise shown. Due to a modification of the drive current 39 by a damping current 41, a resulting coil current 43 can be achieved that is shown in the right diagram of FIG. 7. It can be seen that larger current shares are further away from the carrier 15, with the force effect on the carrier 15 remaining the same due to the greater distance, but there being a possibility of storing additional electrical energy in the electromagnets 21 of the linear motor system.

FIG. 8 shows the selection of an electromagnet 21 for the damping current based on an induced current. The dotted line shows a typical course of the drive current 39 (as also in FIG. 6) when the carrier 15 is moved over the coil at a constant speed and force.

The solid line shows a possible course of an induced voltage (EMF) 45 in the electromagnets 21 (i.e. in their coils) when a carrier 15 is moved at a constant speed over the electromagnets 21. The curved shape of the induced voltage 45 is a measure of how efficiently a current flow in an electromagnet generates a force on the carrier 15. In the carrier position shown, the induced voltage 45 is largest (18 V) in the electromagnet 21 designated as "coil 2" in FIG. 8. In "coil 0" and "coil 4", which are arranged symmetrically to "coil 2", the voltage is in contrast significantly lower (−1.56 V). The ratio of the induced voltages is 11.5.

Depending on this efficiency (i.e. the magnitude of the value of the induced voltage 45), a decision can be made in which electromagnet 21 the drive current 39 is reduced (here "coil 2"; i.e. negative damping current) and in which electromagnet 21 a positive damping current 41 is correspondingly imparted (in this example at "coil 0" and at "coil 4"). So that the force on the carrier 15 remains constant, the drive current 39 in "coil 2" can e.g. be reduced by 5% in this position and the drive current in "coil 0" and "coil 4" can be increased by 5%*11.5=57.5%. In this way, the total current flowing through the electromagnets 21 is increased, whereby electrical energy can be stored in the electromagnets 21.

Due to the temporary storage of electrical energy in the electromagnets 21, oscillations and/or current and voltage fluctuations in the power supply network 35 can be reduced.

REFERENCE NUMERAL LIST 11 linear motor system
13 segment
15 carrier
17 guide track
19 guide axis
21 electromagnets
23 drive magnet
25 guide rollers
27 guide track
29 position detection device
31 position magnet
33 switching converter
34 transistor
35 power supply network
36 control electronics
37 control device
38 current sensor
39 drive current
40 induced coil current
41 damping current
42 voltage sensor
43 resulting coil current
44 model
45 induced voltage

The invention claimed is:

1. A linear motor system, comprising:
a guide track having a plurality of electromagnets that are arranged distributed along the guide track and that are supplied with electrical energy from a power supply network;
a carrier that is guided at and movable along the guide track and that comprises a drive magnet for cooperating with the electromagnets of the guide track to move the carrier; and
a control device configured to control the movement of the carrier relative to the guide track by energizing at least one of the electromagnets by means of a drive current, wherein
the control device is further configured to energize the at least one of the electromagnets with a damping current such that the energizing with the damping current results in no additional movement and/or no change in the movement of the carrier along the guide track generated by the drive current and/or in no additional force on the carrier and/or no change in the force on the carrier generated by the drive current,
wherein the energizing with the damping current reduces oscillations and/or current and voltage fluctuations in the power supply network; and
wherein the drive current and the damping current are superposed in one or more of the electromagnets.

2. The linear motor system in accordance with claim 1, wherein the control device is further configured to energize those of the at least one of the electromagnets by means of the damping current that do not effect a movement of the carrier at a respective point in time.

3. The linear motor system in accordance with claim 1, wherein the control device is further configured to impart the damping current into particular electromagnets of the plurality of electromagnets that are not flowed through by drive current at a respective point in time.

4. The linear motor system in accordance with claim 1, wherein the control device is further configured to impart the damping current into particular electromagnets of the plurality of electromagnets that are also energized with the drive current.

5. A linear motor system, comprising:
- a guide track having a plurality of electromagnets that are arranged distributed along the guide track and that are supplied with electrical energy from a power supply network;
- a carrier that is guided at and movable along the guide track and that comprises a drive magnet for cooperating with the electromagnets of the guide track to move the carrier; and
- a control device configured to control the movement of the carrier relative to the guide track by energizing at least one of the electromagnets by means of a drive current, wherein
- the control device is further configured to energize the at least one of the electromagnets with a damping current such that the energizing with the damping current results in no additional movement and/or no change in the movement of the carrier along the guide track generated by the drive current and/or in no additional force on the carrier and/or no change in the force on the carrier generated by the drive current,
- the energizing with the damping current reduces oscillations and/or current and voltage fluctuations in the power supply network, and
- the control device is further configured to reduce the drive current in the at least one of the electromagnets by means of the damping current and to impart the damping current into an adjacent electromagnet to compensate a changed force effect on the carrier through the reduced drive current.

6. The linear motor system in accordance with claim 1, wherein the drive current and the damping current imparted into the electromagnets taken together are at least temporarily greater than the drive current alone, with energy being stored in the electromagnets by the greater total current.

7. The linear motor system in accordance with claim 1, wherein the electromagnets are connected to the power supply network by means of switching converters.

8. A linear motor system in accordance with claim 1, wherein the control device is further configured to take into account, for selection of at least one electromagnet that is to be energized with the damping current, an induction voltage caused by the carrier in a plurality of the electromagnets on the movement of the carrier.

9. The linear motor system in accordance with claim 1, wherein the control device is further configured to generate a negative damping current for the at least one electromagnet of the plurality of electromagnets at least temporarily in order to feed electrical energy into the power supply network.

10. The linear motor system in accordance with claim 1, wherein the linear motor system has a plurality of segments that each comprise a plurality of the electromagnets, with the control device being distributed over a plurality of the segments.

11. The linear motor system in accordance with claim 1, further comprising a sensor, wherein the sensor detects the current and/or the voltage in the power supply network and converts the current into a sensor signal,
- wherein the control device comprises a control loop for generating the damping current, with the control loop comprising a reproduction of a negative impedance and a reproduction of a damping member.

12. The linear motor system in accordance with claim 11, wherein the control loop comprises logic that determines the damping current for the electromagnets from a control signal.

13. The linear motor system in accordance with claim 1, wherein the linear motor system comprises a plurality of segments, with each segment comprising a plurality of the electromagnets, with the segments being arranged in a row and forming a peripheral guide track, with the guide track being arranged at an outer side of the respective segments.

14. A method of operating a linear motor system, wherein the linear motor system includes a guide track having a plurality of electromagnets that are arranged distributed along the guide track and that are supplied with electrical energy from a power supply network, a carrier that is guided at and movable along the guide track and that comprises a drive magnet for cooperating with the electromagnets of the guide track to move the carrier, and a control device to control the movement of the carrier relative to the guide track by energizing some of the electromagnets by means of a drive current, the method comprising:
- energizing at least one of the electromagnets with a damping current such that the energizing with the damping current results in no additional movement and/or no change in the movement of the carrier along the guide track generated by the drive current and/or in no additional force on the carrier and/or no change in the force on the carrier generated by the drive current,
- wherein the energizing with the damping current reduces oscillations and/or current and voltage fluctuations in the power supply network; and
- the control device is further configured to generate a positive damping current for at least one electromagnet at least temporarily in order to lead off electrical energy from the power supply network.

15. The linear motor system in accordance with claim 7, wherein the switching converters each act as a load having a constant power.

16. A linear motor system, comprising:
- a guide track having a plurality of electromagnets that are arranged distributed along the guide track and that are supplied with electrical energy from a power supply network;
- a carrier that is guided at and movable along the guide track and that comprises a drive magnet for cooperating with the electromagnets of the guide track to move the carrier; and
- a control device configured to control the movement of the carrier relative to the guide track by energizing at least one of the electromagnets by means of a drive current, wherein
- the control device is further configured to energize the at least one of the electromagnets with a damping current such that the energizing with the damping current results in no additional movement and/or no change in the movement of the carrier along the guide track generated by the drive current and/or in no additional force on the carrier and/or no change in the force on the carrier generated by the drive current,
- wherein the energizing with the damping current reduces oscillations and/or current and voltage fluctuations in the power supply network, and
- wherein the control device is further configured to generate a positive damping current for at least one electromagnet at least temporarily in order to lead off electrical energy from the power supply network.

17. The linear motor system in accordance with claim 13, wherein the control loop comprises logic that determines the damping current for the electromagnets from a control signal based on further boundary conditions.

* * * * *